(12) United States Patent
Wachtler et al.

(10) Patent No.: US 7,537,218 B2
(45) Date of Patent: May 26, 2009

(54) CHUCK JAW WITH ADJUSTABLE TOOTH

(76) Inventors: William R. Wachtler, 759 Santa Camelia, Solana Beach, CA (US) 92075; John C. Read, 2627 Lone Jack Rd., Encinitas, CA (US) 92024

( * ) Notice: Subject to any disclaimer, the term of this patent is extended or adjusted under 35 U.S.C. 154(b) by 93 days.

(21) Appl. No.: 11/492,184

(22) Filed: Jul. 24, 2006

(65) Prior Publication Data
US 2008/0018062 A1 Jan. 24, 2008

(51) Int. Cl.
B23B 31/16 (2006.01)
B23B 31/171 (2006.01)

(52) U.S. Cl. .................. 279/123; 279/112; 279/121

(58) Field of Classification Search ............ 279/123, 279/124, 112, 121, 152, 153, 154, 114, 118, 279/119, 132, 110
See application file for complete search history.

(56) References Cited

U.S. PATENT DOCUMENTS

| | | | | |
|---|---|---|---|---|
| 346,133 | A | | 7/1886 | Singer |
| 2,687,308 | A | * | 8/1954 | Highberg et al. ............. 279/123 |
| 2,869,884 | A | * | 1/1959 | Etchell ........................ 279/123 |
| 3,151,871 | A | | 10/1964 | Multer |
| 3,281,158 | A | * | 10/1966 | Gibbons ...................... 279/121 |
| 3,679,221 | A | * | 7/1972 | Behrens ....................... 279/153 |
| 4,353,561 | A | | 10/1982 | Peterson |
| 4,569,530 | A | * | 2/1986 | Cross ........................... 279/123 |
| 4,706,973 | A | * | 11/1987 | Covarrubias et al. ......... 279/153 |
| 4,763,906 | A | * | 8/1988 | Barbieux ..................... 279/123 |
| 4,771,933 | A | | 9/1988 | Rohm |
| 4,938,491 | A | | 7/1990 | Sumenko et al. |
| 4,946,177 | A | * | 8/1990 | Barbieux ..................... 279/123 |
| 4,960,285 | A | * | 10/1990 | Doi ............................. 279/123 |
| 5,015,003 | A | * | 5/1991 | Ramunas ..................... 279/123 |
| 5,040,806 | A | * | 8/1991 | Hiestand ...................... 279/110 |
| 5,199,725 | A | * | 4/1993 | Jaggers ....................... 279/123 |
| 5,409,242 | A | * | 4/1995 | Gonnocci .................... 279/106 |
| 5,464,232 | A | * | 11/1995 | Chizmadia .................. 279/124 |
| 5,522,608 | A | | 6/1996 | Kitson et al. |
| 5,542,686 | A | * | 8/1996 | Revuelta ..................... 279/153 |
| 5,735,534 | A | * | 4/1998 | Edwards ..................... 279/124 |

(Continued)

FOREIGN PATENT DOCUMENTS

JP 61076202 A * 4/1986

(Continued)

*Primary Examiner*—David P Bryant
*Assistant Examiner*—Eric A. Gates
(74) *Attorney, Agent, or Firm*—Palomar Patent; Calif Tervo

(57) ABSTRACT

A jaw for the chuck of a turning device such as a lathe generally comprises a base, a tooth adjustable relative to the base in the radial direction and a cam for adjusting the tooth position. The base may be held on the chuck and driven in a conventional manner. The tooth has a face for engaging a workpiece and is attached to the base such that the face is radially movable relative to the base. The cam includes a surface bearing against the base and a surface bearing against the tooth. The cam varies in thickness such that movement of the cam changes the radial distance between the base and the tooth. In exemplary embodiments, the cam is an eccentric cylinder that rotates to adjust the tooth or is wedge shaped and one or both of the bearing surfaces of the tooth and base are ramps.

20 Claims, 3 Drawing Sheets

U.S. PATENT DOCUMENTS

| | | |
|---|---|---|
| 6,354,606 B1 | 3/2002 | Finn, III |
| 6,478,311 B1 * | 11/2002 | Hinson ........................ 279/123 |
| 6,491,305 B2 * | 12/2002 | Sida ............................ 279/124 |
| 6,568,694 B1 | 5/2003 | White |
| 6,679,503 B2 | 1/2004 | Yamazaki et al. |
| 2002/0038939 A1 * | 4/2002 | Fitzpatrick .................. 279/124 |

FOREIGN PATENT DOCUMENTS

JP 61159306 A * 7/1986

* cited by examiner

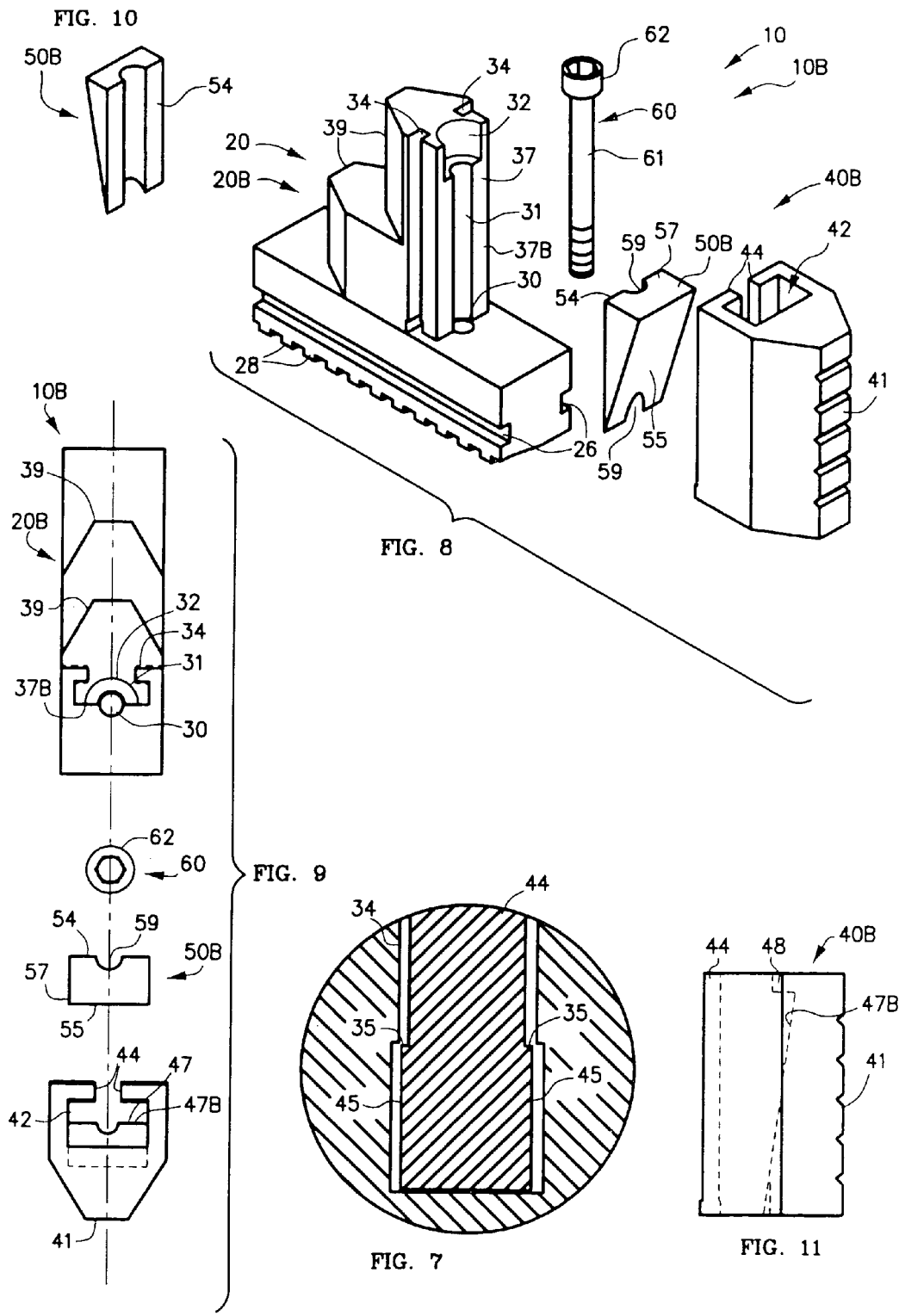

CHUCK JAW WITH ADJUSTABLE TOOTH

FIELD OF THE INVENTION

The invention relates in general to a jaw for a chuck and more specifically to a chuck jaw having an adjustable tooth.

BACKGROUND OF THE INVENTION

The three jaw chuck was designed to align a part being turned to the centerline of a turning device, commonly a lathe. The three jaws move simultaneously and in unison to maintain a center line through its clamping range. Its development significantly decreased the set-up time for machining.

Frequently, however, and particularly in repair work, the centerline of one or more of the turned areas is not aligned with the center of the segment of the part that is being held by the chuck. Also, due to machine wear or surface irregularities of the part, the centers do not align. When this happens, the conventional three jaw chuck is not useable and a four jaw chuck is usually employed.

In a four jaw chuck, each of the jaws moves independently. The jaws are moved to approximately the dimensions of the part about the centerline, the part is placed in, and each jaw is moved to clamp on the part. A dial indicator is placed in contact with the surface of the segment to be worked on and the chuck is rotated by hand to determine the displacement of the centerline of the segment from the centerline of the chuck. The jaws are then moved independently to align the centerlines, the part re-clamped, and alignment rechecked with the indicator. This may take several iterations and 30 to 40 minutes.

Therefore, there is a need for a jaw having a tooth that is easily radially adjustable such that any chuck, and particularly three jaw chucks, can be used and with much shorter set-up time.

SUMMARY OF THE INVENTION

The invention is a jaw for the chuck of a turning device such as a lathe and it generally comprises a base, a tooth adjustable relative to the base in the radial direction and a cam for adjusting the tooth. The base may be restrained to the chuck and driven in a conventional manner well-known in the art. The base has a cam bearing surface.

The adjustable tooth has a face for engaging a workpiece and a cam bearing surface. The base and tooth are attached by spaced opposed tracks disposed in spaced opposed channels such that the face is radially movable relative to the base. The movable cam includes a base bearing surface bearing against the cam bearing surface of the base and a tooth bearing surface bearing against the cam bearing surface of the tooth. The cam varies in thickness such that movement of the cam changes the radial distance between the cam bearing surface of the base and the cam bearing surface of the tooth, thereby changing the radial distance between the tooth face and the cam bearing surface of the base.

In an exemplary embodiment, the cam is a cylinder varying in diameter such that rotation of the cam adjusts the tooth. In another example, the cam is wedge shaped and one or both of the bearing surfaces of the tooth and base are ramps.

Other features and many attendant advantages of the invention will become more apparent upon a reading of the following detailed description together with the drawings wherein like reference numerals refer to like parts throughout.

BRIEF DESCRIPTION OF THE DRAWINGS

FIG. 3 is an exploded front elevation view of the jaw of FIG. 1.

FIG. 4 is a left side elevation view of the jaw base; the right side elevation view being a mirror image.

FIG. 5 is a left side elevation view of the adjustable tooth; the right side elevation view being a mirror image.

FIG. 6 is a side elevation view of the adjustment cam; the other side elevation views being identical.

FIG. 7 is an enlarged side elevation view of the exemplary attachment of the tooth to the base.

FIG. 8 is an exploded inner end, front, left side perspective view of a second embodiment of the jaw according to the invention.

FIG. 9 is an exploded front elevation view of the jaw of FIG. 8.

FIG. 10 is a front, right side, outer end perspective view of the wedge of FIG. 8.

FIG. 11 is a left side elevation view of the adjustable tooth; the right side elevation view being a mirror image.

DETAILED DESCRIPTION OF THE INVENTION

Figure 1:
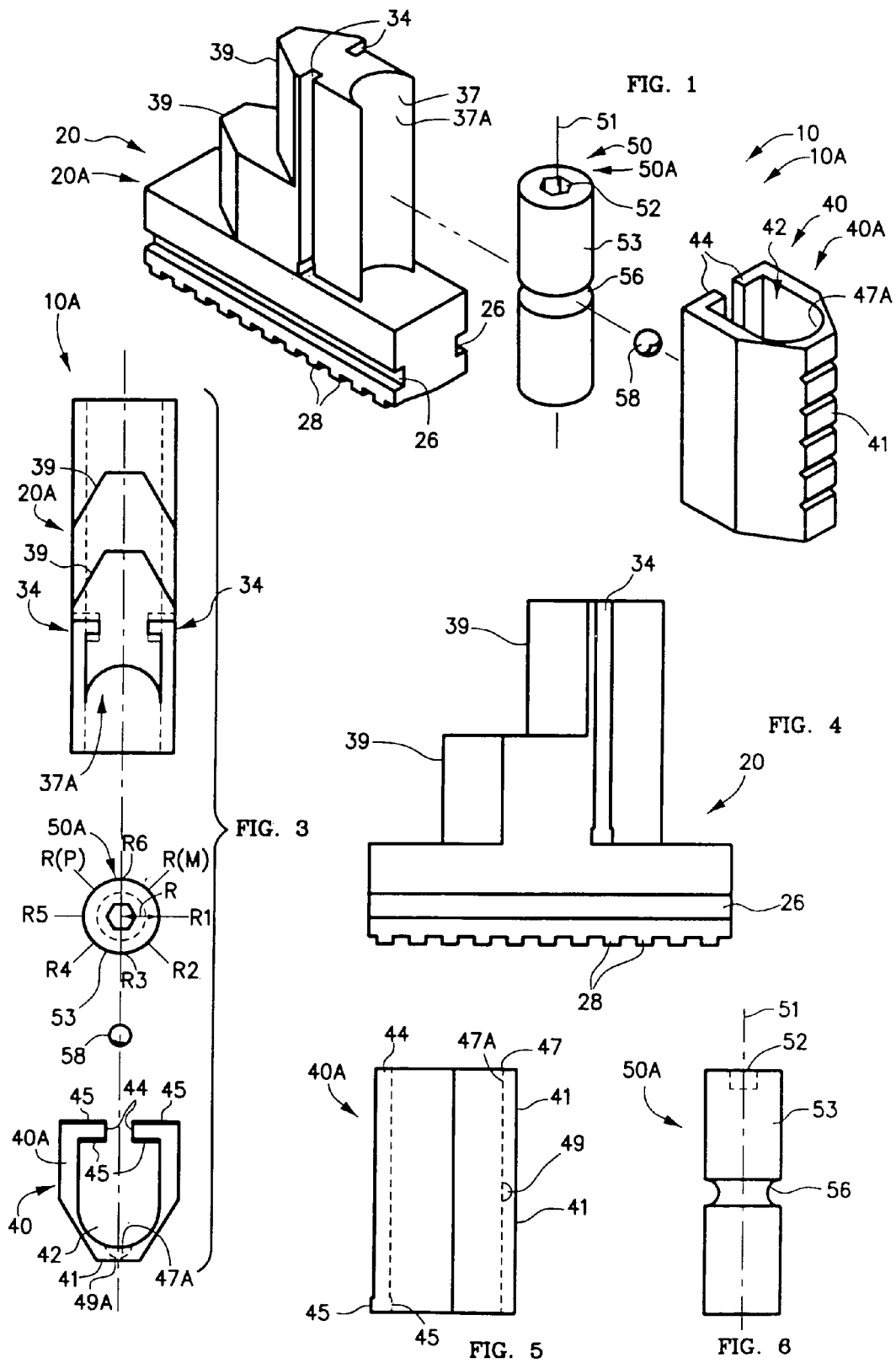
FIG. 1 is an exploded front, left side, inner end perspective view of a jaw according to the invention.
Figure 2:
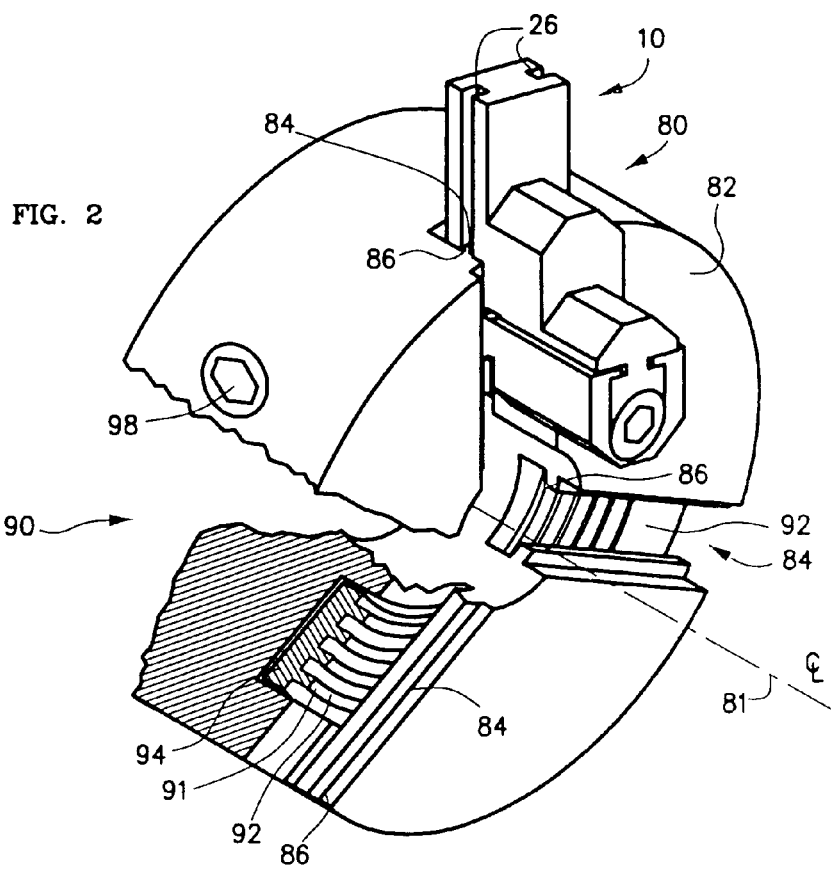
FIG. 2 is a partially cut away, front, left side perspective view of a three jaw lathe chuck including the jaw of FIG. 1.

With reference now to the drawings, and more particularly to FIGS. 1 and 2 thereof, there is shown in FIG. 1 an exploded front, left side, inward end perspective view of a jaw 10, such as jaw 10A with an adjustable tooth 40, such as tooth 40A, for holding a tool or workpiece, and in FIG. 2 a partially cut away, front, left side perspective view of a three jaw lathe chuck 80 including jaw 10A of FIG. 1. The other two jaws are not shown.

Chuck 80 is of conventional three jaw type for mounting on a machine tool (not shown), such as an engine lathe, for rotation about center line 81. A face plate 82 on the front includes three slots 84, each for receiving and retaining a jaw 10 such that jaw 10 can move radially in slot 84. Slots 84 are equally spaced and extend radially from the centerline 81. Slots 84 include retaining means, such as opposing ribs 86 for receiving retaining means, such as channels 26 on opposite sides of the base 20 of jaw 10. Although for illustrative purposes, only one jaw 10 is shown mounted on a slot 84, the other slots 84 would also contain jaws 10.

As seen in the cut-away portion of FIG. 2, radial adjustment means, such as scroll assembly 90, adjusts the radial position of al jaws 10 in slots 84. In the embodiment shown, a scroll assembly 90 simultaneously radially adjusts the positions of jaws 10 in slots 84. Scroll assembly 90 includes a scroll plate 91 mounted in chuck 80 so as to be rotatable about center line 81. A scrolled ridge 92 on the front of scroll plate 91 engages radial drive means, such as drive teeth 28 on the back of jaw base 20 for radially moving jaw 10 in slots 84 responsive to rotation of scroll plate 91. A pinion 98 rotatably mounted in chuck 80 engages a circular rack 94 on back of scroll plate 91 for rotating scroll plate 91 responsive to rotation of pinion 98, such as by an operator using a pinion engaging key (not shown).

Although a conventional chuck is shown and described, it will become apparent that jaw 10 of the invention is applicable to and may be readily adapted to many types of chucks. Therefore, it is to be understood that all matter thereto is to be interpreted as illustrative and not in any limiting sense, and it is intended to cover in the appended claims such modifications as come within the true spirit and scope of the invention.

Returning to FIG. 2 and further including FIGS. 3-7; FIG. 3 is an exploded front elevation view of the jaw 10A of FIG. 1; FIG. 4 is a left side elevation view of jaw base 20, the right side elevation view being a mirror image; FIG. 5 is a left side elevation view of adjustable tooth 40A, the right side elevation view being a mirror image; FIG. 6 is a side elevation view of cylindrical adjustment cam 50A; the other side elevation views being a identical; and FIG. 7 is an enlarged side elevation view of the exemplary attachment means, such as track 44 of tooth 40 and channel 34 of base 20.

Jaw 10A generally includes a base 20A, an adjustable tooth 40A, such as tooth 40A, a cam 50, such as generally cylindrical cam 50A, and a cam retainer, such as ball 58. Base 20A of the exemplary embodiment also includes fixed teeth 39 on the outer end, and a cam bearing surface 37, such as concave bearing surface 37A. Base 20A and tooth 40A include cooperative attaching means, such as a pair of channels 34 and a pair of tracks 44, for attaching adjustable tooth 40A to base 20A.

Adjustable tooth 40A is generally a C-shaped member in front view having a central orifice 42 and generally includes an inner face 41 for gripping a tool or workpiece, cooperating attachment means, such as spaced, front to back tracks 44, for attachment to base 20A, a seat 49 for a cam retainer, such as a bearing, such as ball 58, and a cam bearing surface 47, such as concave cam bearing surface 47A. Face 41 may include ridges or grooves for enhancing gripping friction Left and right tracks 44 are adapted to slide into left and right channels 34, respectively, of base 20. As best seen in FIG. 7, tracks 44 and channels 34 include cooperating retaining means for preventing removal of tooth 40A from base 20A except when tooth 40A is in a specific position. Each track 44 includes small inner and outer flanges 45 on its back end, for retaining tracks 44 in channels 34. Each channel 34 includes inner and outer cavities 35, for receiving flanges 45 of tracks such that tracks 44 may move inwardly and outwardly in channels 34, hence allowing adjustable tooth 40A to move inwardly and outwardly. For example, each flange 45 may protrude 0.010" such that tooth 40A may be adjustable a total of 0.020". Although both inner and outer flanges 45 are shown for each channel 34, a single flange 45 of twice the length could also be used. Channels 34 and tracks 44 may be on either base 20A or tooth 40A.

Cylindrical cam 50A is a slightly eccentric cylinder having an axis 51 of rotation parallel to centerline 81 of chuck 80. Activation means, such as hexagonal socket 52 in front end of cylindrical cam 50A, is used by an operator for rotating cylindrical cam 50A. Circumferential race 56 receives ball 58. Cylindrical cam 50A includes a surface 53 including diametrically opposed bearing surfaces adapted to bear against bearing surface 37A of base 20A and bearing surface 47A of adjustable tooth 40A and bearing surface 37A of base 20A.

As best seen in FIG. 3, the diameter of cylindrical cam 50A varies. For example, in the exemplary embodiment, the inner half of cylindrical cam 50A has a radius R, such as at 90 degrees, 145 degrees, 180 degrees, 225 degrees and 270 degrees, R1-R5 respectively, while the outer half has a radius R(M) at 315 degrees that is 0.010" less than the radius R, a radius R at 0 degrees R6, and a radius R(P) at 45 degrees that is 0.010" more than radius R. Preferably, cylindrical cam 50A is faired from R1 to R(P) counter clockwise as seen in FIG. 3 to smoothly transition from a radius R to R(M) back to R and finally to R(P). Bearing surface 47A of tooth 40A is adapted for receiving cylindrical cam 50A. Preferably, there is a sharp transition in cam surface 53 at R(P) such that the cam surface 53 from R5 to R(P) has radius R. This allows the bearing surface 47A of tooth 40A to be a semicircle of radius R in cross-section which provides a more stable bearing for cam 50A. If cam surface 53 is completely faired, then bearing surface 47A of tooth 40A is preferably concave and has a radius of R(P) or greater. In a standard size lathe, radius R is typically about 0.5". Bearing surface 37A of base 20A is adapted for receiving cylindrical cam 50A. Preferably, bearing surface 37A is concave to have a centering effect and has a radius of R(P) or greater. The middle of the concave surfaces 37A, 47A are on the center line. Preferably, as shown, the central arc of tooth bearing surface 47A has a radius on either side equal to the radius of the surface of cam 50A seated therein. For example, bearing surface 47A has central arc about the centerline of at least 90 degrees of radius R, and the outer half of cam 50A has a radius of R. Thus, the mating surface of cam 50a will exactly seat in bearing 47A over its adjusting movement. Preferably, the mating surfaces are the same radius over sixty degrees of arc or more.

Jaw 10A is assembled by placing ball 58 in seat 49 on tooth 40A. Cylindrical cam 50A is then inserted in orifice 42 toward the outer side of orifice 42 with the R3-R6 diameter radially oriented. This places cylindrical cam 50A in the "neutral position" with a diameter of 2R on the centerline. Cylindrical cam 50A is moved inward such that seated ball 58 is in race 56. Tracks 44 are inserted into channels 34. From this neutral position in which tooth 40A may be removed from base 20A, any rotation of cylindrical cam 50A moves track flanges 45 either inward or outward into channel cavities 35 such that tooth 40A cannot be removed from base 20A.

Rotation of cylindrical cam 50A changes the radial distance between cam bearing surface 37A of base 20A and cam bearing surface 47A of tooth 40A, thereby changing the relative radial distance between tooth face 41 and base 20A. In the exemplary embodiment described, tooth 40A can be moved radially relative to base 20A plus and minus 0.010" by rotation of cylindrical cam 50A plus or minus 45 degrees.

Figure 12:
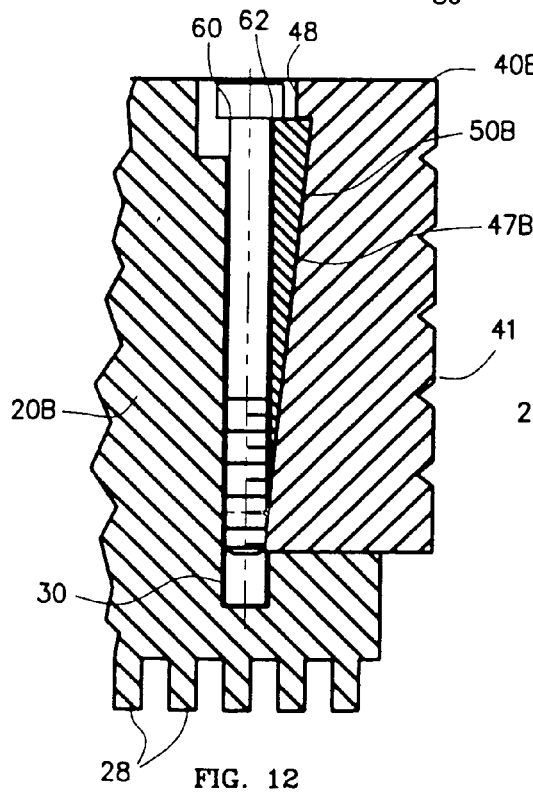
FIG. 12 is a partial cross sectional view of the jaw with the adjustable tooth in the radially outward position.
Figure 13:
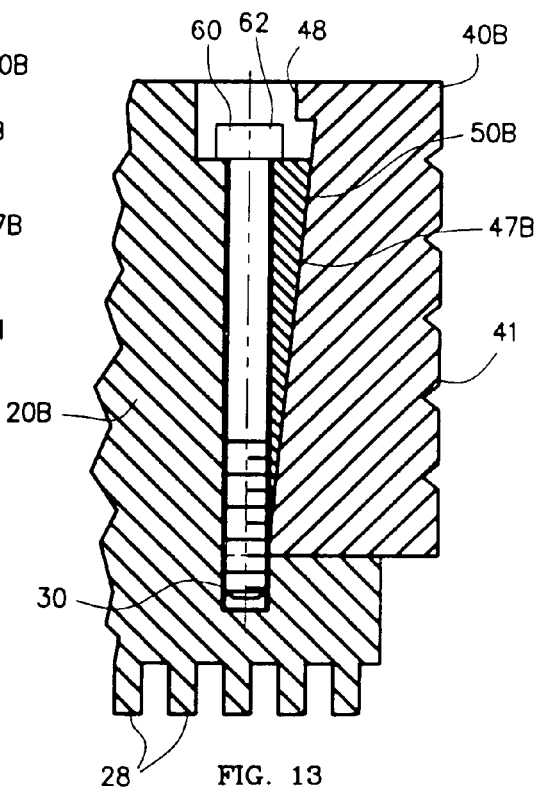
FIG. 13 is a cross sectional view similar to FIG. 12 but with the adjustable tooth in the radially inward position.

FIGS. 8-13 show a second exemplary embodiment of jaw 10, such as jaw 10B, wherein cam 50 is in the form of a wedge cam 50B. FIG. 8 is an exploded inner end, front, left side perspective view of a second embodiment 10B of jaw 10 according to the invention; FIG. 9 is an exploded front elevation view of jaw 10B of FIG. 8; FIG. 10 is a front, right side, outer end perspective view of wedge cam 50B of FIG. 8; FIG. 11 is a left side elevation view of adjustable tooth 40B; the right side elevation view being a mirror image; FIG. 12 is a partial cross sectional view of jaw 10B with adjustable tooth 40B in the radially outward position; and FIG. 13 is a cross sectional view similar to FIG. 12 but with adjustable tooth 40B in the radially inward position.

Jaw 10B is similar to jaw 10A except as noted. Jaw 10B generally includes a base 20B, an adjustable tooth 40B, a wedge cam 50B, and cam adjustment means, such as bolt 60. Bolt 60 includes a shaft 61 having a threaded end and a head 62. Wedge cam 50B includes an outward bearing surface 54, an inner bearing surface 55, a base 57 opposite an apex, and a half bore 59 for receiving bolt shaft 61. Base 20B includes a bearing surface 37, such as inward facing bearing surface 37B for receiving the outward facing bearing surface 54 of wedge cam 50B. A threaded bore 30, half bore 31, and counter sink 32 accommodate bolt 60 for attachment to base 20B.

Tooth 40B includes a radially outward cam bearing surface 47, such as slanted ramp 47B for receiving the inward facing surface 55 of wedge cam 50B, central orifice 42 and a stop 48 for wedge cam 50B.

Jaw 10B is assembled by placing wedge cam 50B in central orifice 42 of tooth 40B such that inward bearing surface 55 rests on ramp 47B. Wedge cam 50B and ramp 47B are adapted, such as by the apex angle of wedge cam 50B and the angle of ramp 47B being equal, so that outward bearing surface 54 of wedge cam 50B is parallel to tooth face 41 and chuck centerline 81. Tooth 40B is attached to base 20B by inserting tracks 44 into channels 34. Bolt 60 is screwed partially into bore 30. Preferably, bearing surfaces 54, 55, 37B, 47B are adapted, such as by being smooth and lubricated, such that wedge cam 50B slides freely and any outward pressure on face 41 of tooth 40B moves wedge cam 50B forward along ramp 47B such that tooth 40B is in the outward position shown in FIG. 12. In the radially outward position, wedge cam 50B is held by means, such as stop 48 of tooth 40B or head 62 of bolt 60 as seen in FIG. 12.

Tooth 40B is moved from the radially outward position of FIG. 12 to the radially inward position of FIG. 13 by further screwing bolt 60 into bore 30 whereby bolt head 62 pushes base 57 of wedge cam 50B rearward along ramp 47B such that tooth 40B is moved radially inward. A typical range of motion would be 0.020".

Although in the exemplary embodiment, the bearing surface of tooth 40B includes ramp 47B and the bearing surface 37A of base 20B is horizontal, these surfaces could be reversed or both could be ramped.

Although a displacement capability of 0.020" is sufficient for the majority of normal requirements, the jaw is not so limited and is easily adaptable by one reasonably skilled in the art to provide larger displacements.

From the foregoing description, it is seen that the present invention provides an extremely simple, quick and reliable manner of adjusting the jaws of chuck. It allows a three jaw chuck to be used in many instances where it otherwise could not be used and it shortens the typical adjustment time from 30-45 minutes to 5 minutes.

The foregoing is a complete description of two exemplary embodiments of a chuck jaw with an adjustable tooth which is constructed in accordance with the principles of this invention. It is likely that changes and modifications will occur to those skilled in the art which are within the inventive concepts disclosed and claimed herein. Therefore, it is to be understood that modifications and substitutions can be made by a person skilled in the art without departing from the spirit and scope of the invention.

We claim:

1. A jaw for a chuck of a turning device; the chuck rotating about a centerline; said jaw comprising:
    a base having left and right sides and including:
        retaining means for retaining said base to said chuck;
        radial adjustment means for cooperating with the chuck for adjusting said base radially outwardly from the center line of the chuck; and
        a radially facing, cam bearing surface;
    a tooth having left and right sides and including:
        a face for engaging a workpiece; and
        a radially facing, cam bearing surface radially spaced from said cam bearing surface of said base; said base and tooth including cooperating attaching means for attaching said tooth to said base such that said face is radially movable relative to said base; and
    a movable cam including:
        a radially facing, base bearing surface bearing against said cam bearing surface of said base; and
        a radially facing, tooth bearing surface facing away from and radially spaced from said base bearing surface and bearing against said cam bearing surface of said tooth; said cam variable in radial thickness between said base bearing surface and said tooth bearing surface by rotational or sliding movement of said cam between said cam bearing surface of said base and said cam bearing surface of said tooth such that rotation or sliding movement of said cam between said cam bearing surface of said base and said cam bearing surface of said tooth changes the radial spacing between said cam bearing surface of said base and said cam bearing surface of said tooth such that said face moves radially relative to said base.

2. The jaw of claim 1 wherein:
    said cooperating attaching means includes spaced opposed tracks disposed in spaced opposed channels.

3. The jaw of claim 2 wherein:
    said tracks and channels include:
        cooperating retaining means for preventing removal of said tooth from said base except when said tooth is in a specific position radially relative to said base.

4. The jaw of claim 3 wherein said cooperating retaining means includes:
    a flange and cavity.

5. The jaw of claim 1 wherein:
    radial movement of said face by said cam does not move said face in a direction parallel to the centerline.

6. A jaw for a chuck of a turning device; the chuck rotating about a centerline; said jaw comprising:
    a base including:
        retaining means for retaining said base to said chuck;
        radial adjustment means for cooperating with the chuck for adjusting said base radially outwardly from the center line of the chuck; and
        a cam bearing surface;
    a tooth including:
        a face for engaging a workpiece; and
        a cam bearing surface radially spaced from said cam bearing surface of said base; said base and tooth including cooperating attaching means for attaching said tooth to said base such that said face is radially movable relative to said base; and
    a rotatable cam including:
        a base bearing surface bearing against said cam bearing surface of said base; and
        a tooth bearing surface facing away from and radially spaced from said base bearing surface and bearing against said cam bearing surface of said tooth; said cam varying in diameter such that rotation of said cam between said cam bearing surface of said base and said cam bearing surface of said tooth changes the radial spacing between said cam bearing surface of said base and said cam bearing surface of said tooth such that said face moves radially relative to said base.

7. The jaw of claim 6 wherein:
    said cam is an eccentric cylinder.

8. The jaw of claim 7 wherein:
    said cam bearing surface of said tooth is concavely radiused to receive said cam.

9. The jaw of claim 7 wherein:
    said cam bearing surface of said tooth and said tooth bearing surface of said cam are arcs of equal radius.

10. The jaw of claim 7 wherein:
said cam bearing surface of said tooth and said tooth bearing surface of said cam are arcs of equal radius of at least sixty degrees about the center line.

11. The jaw of claim 7 wherein:
said cam bearing surface of said base is concavely radiused to receive said cam.

12. The jaw of claim 6 wherein:
said cooperating attaching means includes;
  spaced opposed tracks disposed in spaced opposed channels.

13. The jaw of claim 12 wherein:
said tracks and channels include:
  cooperating retaining means for preventing removal of said tooth from said base except when said tooth is in a specific position radially relative to said base.

14. The jaw of claim 13 wherein:
said cooperating retaining means includes:
  a flange and cavity.

15. The jaw of claim 6 wherein:
radial movement of said face by said cam does not move said face in a direction parallel to the centerline.

16. A jaw for a chuck of a turning device; the chuck rotating about a centerline; said jaw comprising:
  a base including:
    retaining means for retaining said base to said chuck;
    radial adjustment means for cooperating with the chuck for adjusting said base radially outwardly from the center line of the chuck; and
    a radially facing, cam bearing surface;
  a tooth including:
    a face for engaging a workpiece;
    attaching means for attaching said tooth to said base such that said face is radially movable relative to said base; and
    a radially facing, cam bearing surface radially spaced from said cam bearing surface of said base; and
  a slideable cam including:
    a radially facing, base bearing surface bearing against said cam bearing surface of said base; and
    a radially facing, tooth bearing surface facing away from and radially spaced from said base bearing surface and bearing against said cam bearing surface of said tooth; said cam variable in radial thickness between said base bearing surface and said tooth bearing surface by sliding movement of said cam between said cam bearing surface of said base and said cam bearing surface of said tooth such that sliding movement of said cam between said cam bearing surface of said base and said cam bearing surface of said tooth changes the radial spacing between said cam bearing surface of said base and said cam bearing surface of said tooth such that said face moves radially relative to said base.

17. The jaw of claim 16 wherein:
said cam bearing surfaces form a wedge.

18. The jaw of claim 16 wherein:
said cam bearing surfaces form a wedge; and
at least one of said cam bearing surfaces of said base or said tooth is a ramp.

19. The jaw of claim 16 wherein:
said cooperating attaching means includes;
  spaced opposed tracks disposed in spaced opposed channels including:
    cooperating retaining means for preventing removal of said tooth from said base except when said tooth is in a specific position radially relative to said base.

20. The jaw of claim 16 wherein:
radial movement of said face by said cam does not move said face in a direction parallel to the centerline.

* * * * *